United States Patent [19]

Tumblin

[11] 4,321,853
[45] Mar. 30, 1982

[54] AUTOMATIC EAR TRAINING APPARATUS

[75] Inventor: John E. Tumblin, Atlanta, Ga.

[73] Assignee: Georgia Tech Research Institute, Atlanta, Ga.

[21] Appl. No.: 173,601

[22] Filed: Jul. 30, 1980

[51] Int. Cl.³ .................... G09B 15/02; G09B 15/08; G10G 1/02

[52] U.S. Cl. .................. 84/454; 84/470 R; 84/477 R; 84/478; 84/484

[58] Field of Search ............... 84/470 R, 477 R, 478, 84/484, 454

[56] References Cited

U.S. PATENT DOCUMENTS

| | | | |
|---|---|---|---|
| 3,610,086 | 10/1971 | Decker | 84/470 R |
| 3,766,818 | 10/1973 | Prohofsky | 84/454 |
| 3,774,494 | 11/1973 | Reid, Sr. et al. | 84/470 R |
| 3,861,266 | 1/1975 | Whitaker | 84/454 |
| 3,878,754 | 4/1975 | Barnum | 84/454 |
| 3,905,269 | 9/1975 | Doerksen et al. | 84/470 R |
| 3,919,913 | 11/1975 | Shrader | 84/454 |
| 3,991,648 | 11/1976 | Karpowicz | 84/470 R |
| 4,014,167 | 3/1977 | Hasegawa et al. | 84/454 X |
| 4,024,789 | 5/1977 | Humphrey et al. | 84/477 R |
| 4,028,985 | 6/1977 | Merritt | 84/454 |
| 4,041,832 | 8/1977 | Risch | 84/454 |
| 4,273,023 | 6/1981 | Mercer | 84/454 |

Primary Examiner—S. J. Witkowski
Attorney, Agent, or Firm—Newton, Hopkins & Ormsby

[57] ABSTRACT

An electronic device for use in aiding the instruction of musical students. The device is comprised of a metronome and a plurality of tone generators, all under the control of a microprocessor computer. Input devices for the system take the form of a musical keyboard and a microphone. The metronome produces an audible regularly repeated sound in the loudspeaker of the device and causes a visual display of a plurality of indicator lights to be lit simultaneously. Pitch error information is displayed on a plurality of indicator lights which indicate musical sharp, flat or correct pitch. The tone generators produce tones in the loudspeaker under the control of the program in the microprocessor. The device has the capability of interacting with the student to exchange musical responses which each is capable of understanding and judging.

8 Claims, 6 Drawing Figures

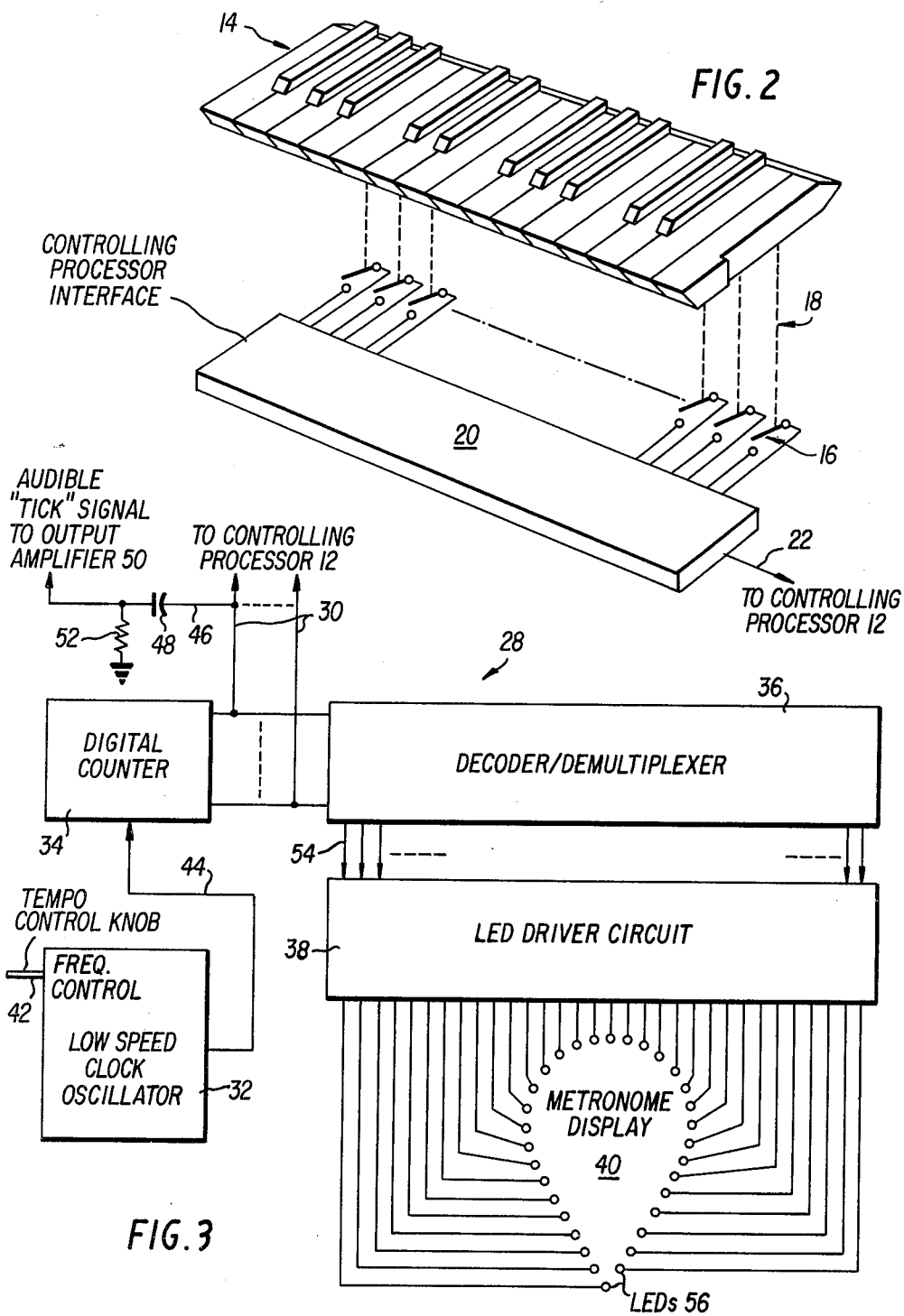

U.S. Patent  Mar. 30, 1982  Sheet 3 of 4  4,321,853
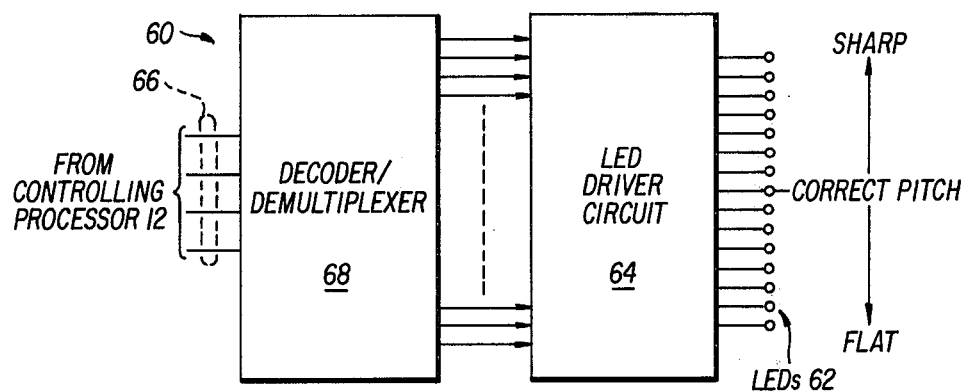
FIG. 4
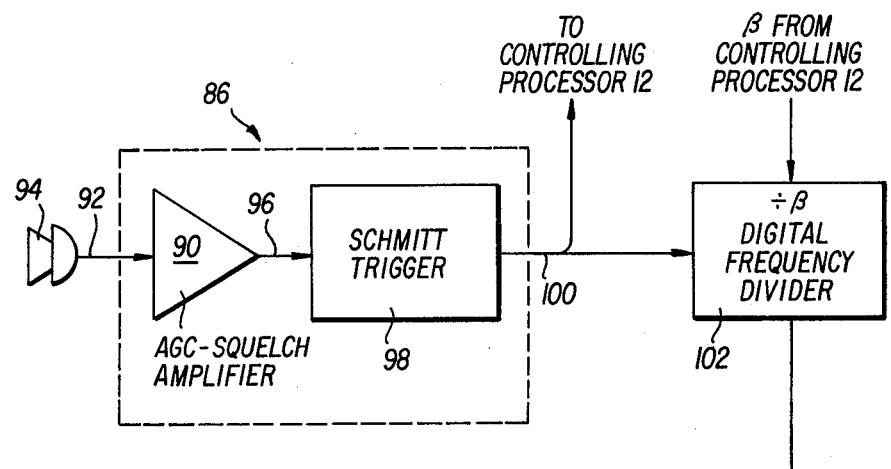
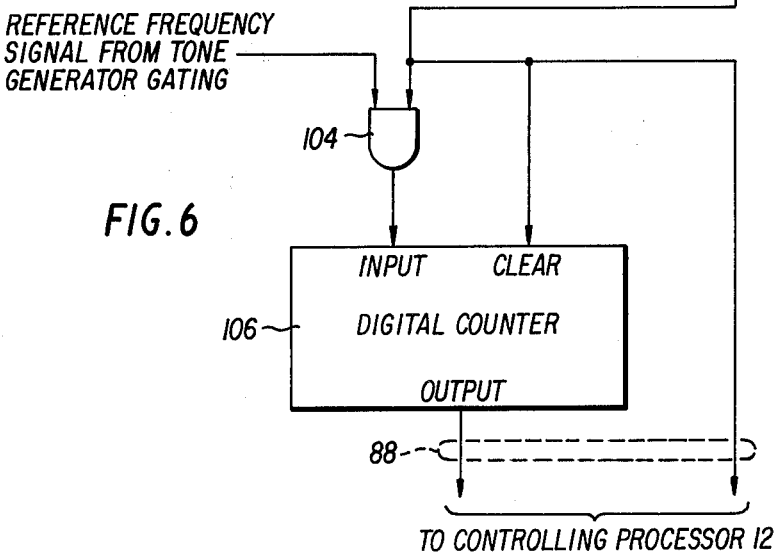
FIG. 6

AUTOMATIC EAR TRAINING APPARATUS

BACKGROUND OF THE INVENTION

1. Field of the Invention

This invention relates to a music theory training system, and more particularly to automatic ear training apparatus for use in the training of students in some music theory.

2. Description of the Prior Art

One method for teaching basic music theory requires that a tutor with sufficient ear training work with students in drill sessions to detect and indicate pitch and rhythmic errors made by the students. Since the purpose of ear training is to sharpen the perception and judgment of sounds made by the student, rarely can the student teach himself effectively. If a group of students is assembled whose recognition of pitch and rhythmic differences is good, but whose correction of errors is lacking, and these difficulties are not severe, one teacher may drill the group with reasonable success. However, a student having considerably more difficulty than his classmates does not benefit greatly from such a class, and is better taught individually. In classroom drills, the individual student cannot have confirmation of correct or incorrect responses except for the most blatant errors, which should already be obvious to the student. More subtle mistakes, perhaps only suspected by the student, or not perceived by the student at all, will pass uncorrected in this situation.

Unfortunately, individual tutoring often is not available. Such ear training drills are extremely time-consuming and are most often beneficial only on an individual basis. It can be seen that these drills constitute very ineffective use of the time of the music teacher. Although ear training magnetic tapes are available for use in drilling students, they can do no more than indicate errors within the perception of the student, and they are also unable to correct student responses, and hence have limited value in unsupervised ear training. One way of better utilizing the presence of a teacher for this particular type of exercise is by use of an interactive musical training device.

Heretofore, electronic devices for use in training musical students have been disclosed. For example, U.S. Pat. Nos. 3,991,648 to Karpowicz, 3,919,913 to Shrader, 3,905,269 to Doerksen and 3,610,086 to Decker, all disclose electronic music teaching devices.

OBJECT OF THE INVENTION

The object of this invention is to automate the teaching of music theory fundamentals that relate to perception and judgement of pitch and rhythm by the student.

SUMMARY OF THE INVENTION

The device of this invention is capable of detecting errors of pitch and/or rhythm in a given student musical exercise with an accuracy greater than that of the average human ear and display both the type and the magnitude of the error in a manner useful to the student. The device can point out the errors committed by the student, allowing the student to sharpen pitch and rhythmic acuity without requiring the personal attention of an instructor. This is possible because the student no longer depends upon his own pitch and rhythmic judgements.

The apparatus of this invention is primarily comprised of a metronome and a plurality of tone generators, all under the control of a microprocessor. The input devices for the system take the form of a musical keyboard and a microphone. Musical inputs may be material that is either sung by the student, played by the student on certain musical instruments (e.g., a flute) whose pitch is recognizable to the circuitry of the apparatus, or played on a musical instrument (e.g., a piano-type keyboard) properly connected to the circuitry of the apparatus. Outputs of the apparatus include musical notes generated and controlled by the circuitry of the apparatus, an audible metronome signal produced in the loudspeaker of the system for musical timing by the student, a metronome display to show the timing of the musical notes, a pitch error display to show the student any errors detected in the pitch of his response, and miscellaneous displays to show the student other pertinent data (e.g., system status, page and exercise number, or special error signals for the device or for the student).

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 2 is a schematic representation of a piano-type keyboard and an associated switch array;

FIG. 3 is a block diagram of the electronic metronome portion of the apparatus of FIG. 1;

FIG. 4 is a block diagram of the pitch error display portion of the apparatus of FIG. 1;

FIG. 6 is a block diagram of the listen circuit portion of the apparatus of FIG. 1.

DETAILED DESCRIPTION OF THE PREFERRED EMBODIMENTS

Figure 1:
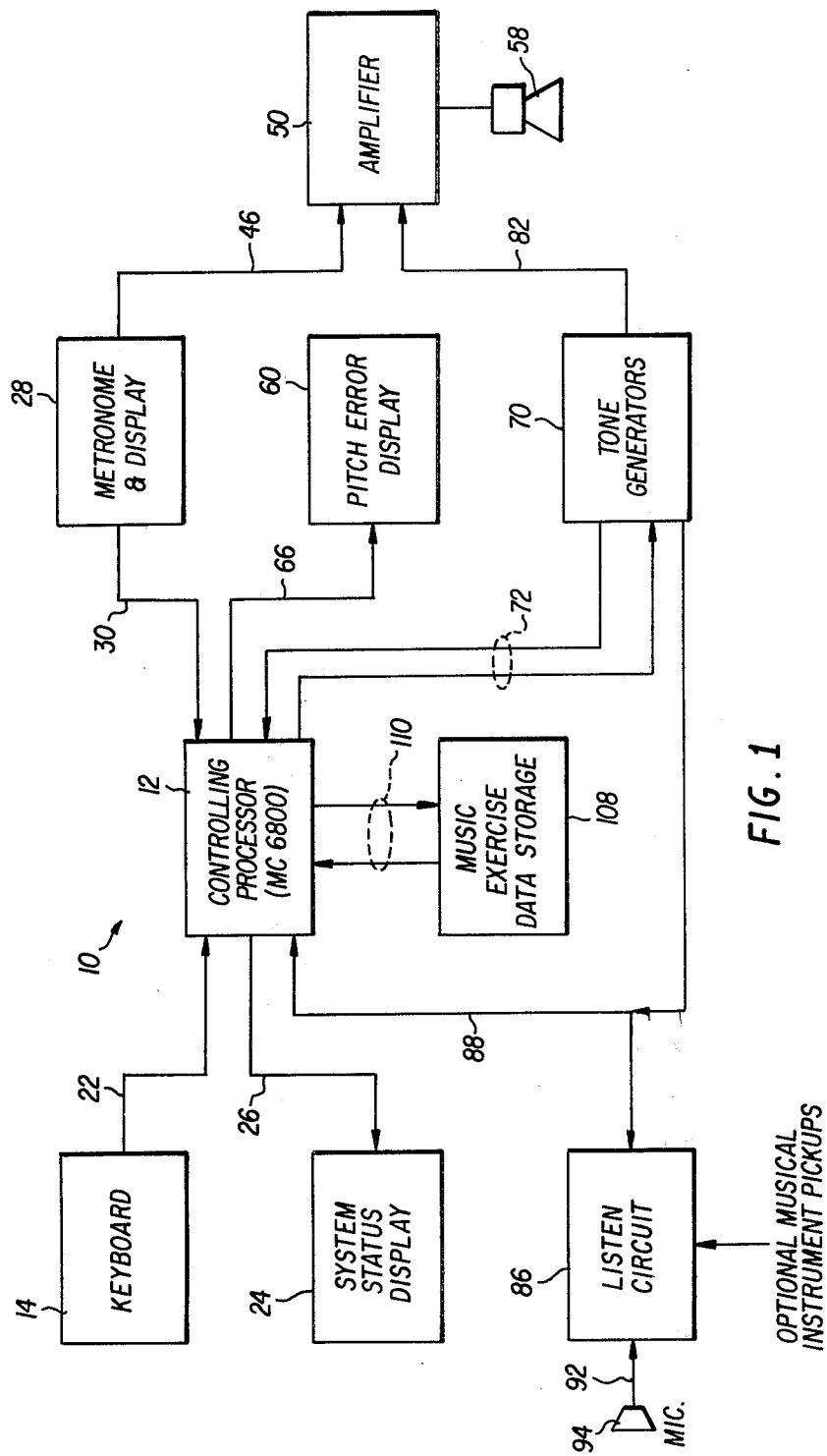
FIG. 1 is a block diagram illustrating the primary components of the automatic ear training apparatus of this invention for use in teaching some music theory fundamentals.

A block diagram of the system 10 of this invention is set forth in FIG. 1. The diagram shows a microprocessor 12 (e.g., Motorola 6800-Family Microprocessor Hardware) as the control center of the system. Although the use of a microprocessor or any other form of computer control greatly enhances the flexibility of the system, it is not required and could be replaced by sequential and combinational logic. For simplicity, the description of the system 10 will hereinafter refer to the system controlling circuitry, consisting of the microprocessor computer 12, as the controlling processor.

The piano-type keyboard 14 represents a musical device connected directly to the music theory training system 10. The keyboard 14 is seen in more detail in FIG. 2. The keys of keyboard 14 actuate an array of switches 16, through corresponding linkages 18, and the outputs thereof, via interface 20 and output 22, are readable by the controlling processor 12. This output signal information from keyboard 14 is available to any other device in the system 10 through the controlling processor 12. Any other musical device whose pitch and rhythm control information can be converted into electrical code understandable to the controlling processor 12 may be connected to the system in a similar manner.

The system status display 24, of conventional construction, is used to convey miscellaneous information useful to the student in operation of the system. The output from controlling processor 12 to the system status display 24 is on output line 26.

The electronic metronome 28 and its display is a simple clock-counter arrangement whose tempo, or speed of the clock, is set by the student and whose output (binary numbers corresponding to the number of beat fractions that have passed since the last beat) may be received and read on interface 30 by the controlling processor. As seen in FIG. 3, the electronic metronome 28 consists of a low-speed clock oscillator 32, digital counter 34, decoder/demultiplexer 36, light-emitting diode (LED) driver circuit 38 and display 40. The oscillator 32 includes a tempo control knob 42 that is adjusted by the student to vary the frequency of the signal on output 44 to counter 34. The interface 30 between decoder/demultiplexer 36 and controlling processor 12 includes an output 46 which via capacitor 48 is connected to amplifier 50, as seen in FIG. 1. Output 46 is grounded via resistor 52. LED driver circuit 38 receives an output 54 from decoder/demultiplexer 36 to control a plurality of LEDs 56 in display 40. The LEDs 56 are arranged in the form of a teardrop-shaped ring.

The demultiplexer 36 reads the aforesaid numbers on interface 30 and controls the LEDs 56 of the metronome display 40. As the counter 34 progresses, LEDs 56 in the display ring are successively lit and extinguished to create the illusion of a moving spot of light which on each beat reaches the bottom tip of its teardrop-shaped path. The most significant bit signal on the output 46 from the counter is amplified by amplifier 50 to produce an audible tick on the speaker 58 of FIG. 1 at the beginning of each beat.

The pitch error display 60 consists of a column of indicator lights (e.g., LEDs 62 as seen in FIG. 4) placed vertically and lit one at a time under the control of the LED driver circuit 64, with the position of the lit LED determined by the controlling processor 12. The purpose of display 60 is primarily to give a graphical display of the pitch error of the student. As the input made by the student becomes sharp, an LED at a successively higher position in the column is lit, and as the input goes flat, an LED in a lower position is lit. If the pitch input by the student is correct, the LED in the center of the display will be lit. As in the metronome display, the appearance of motion of a spot of light is created by selectively lighting LEDs, and the level of this apparently moving spot corresponds to the student's pitch error. Since the display is operated by the controlling processor via output 66 and decoder/demultiplexer 68, it may also be used for other level indications.

The tone generator 70 creates, gates and mixes tones on demand from the controlling processor 12 to make up the musical output of the system on speaker 58 in FIG. 1. Within the tone generator circuitry, all musical frequencies are generated continuously and are then individually gated, so that any number of tones may be played simultaneously. Communication between tone generator 70 and controlling processor 12 is through interface 72.

Figure 5:
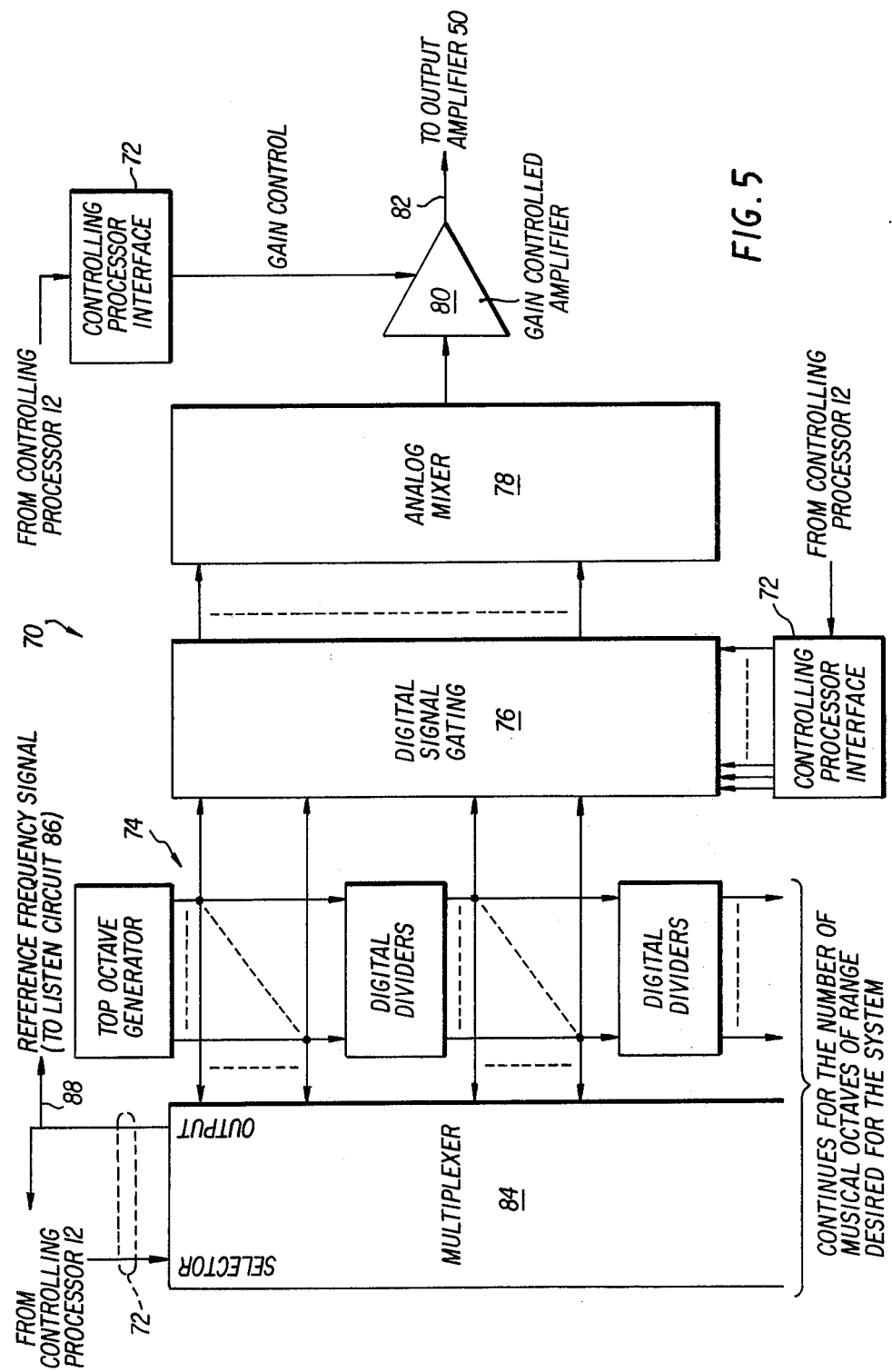
FIG. 5 is a block diagram of the tone generator portion of the apparatus of FIG. 1.

As seen in FIG. 5, the specific apparatus of tone generator 70 is a digital frequency synthesizer 74 whose outputs are gated through gates 76 controlled by the controlling processor into analog mixer 78. Digital frequency synthesizer 74 generates all frequencies of one and successive octaves of chromatic octave. The output of analog mixer 78 is to processor-controlled gain amplifier 80. The output 82 from the gain-controlled amplifier 80 is to amplifier 50 as seen in FIG. 1. Through this path, the controlling processor 12 may cause any combination of tones to be played for the student. The outputs of the frequency synthesizer 74 are also fed to a digital multiplexer 84 whose selection lines are set by controlling processor 12. The output of the multiplexer is then a single reference frequency signal selected from the frequency synthesizer outputs by the controlling processor. This signal is used for pitch judgement by the controlling processor 12 and listen circuit 86 of FIG. 1 via output 88.

The output 82 of the tone generator 70 is combined in the amplifier 50, of FIG. 1, with the audible "tick" signal on output 46 from the electronic metronome 28 to form a signal to drive speaker 58 of the system.

As seen in FIG. 1 and FIG. 6, the listen circuit 86 is a simple device used to detect pitch errors in the audible inputs made by the student. The listen circuit works in conjunction with the multiplexer 84, which can supply any one of the musical frequency signals being produced by the tone generator 70, and with the controlling processor. Additionally, rhythmic errors in the students' audible inputs may be detected by using the metronome 28 with the multiplexer 84, the controlling processor 12 and the listen circuit 86. The primary function of the listen circuit 86 is to produce a digital signal, the frequency of which corresponds to that of the fundamental frequency of a voice signal without unduly complex circuitry. As seen in FIGS. 1 and 6, the listen circuit 86 is comprised of an automatic gain control squelch amplifier 90 which receives output 92 from microphone 94. The output 96 from the squelch amplifier 90 inputs the Schmitt trigger 98. The output 100 from Schmitt trigger 98 is to controlling processor 12 via divider circuit 102, gate 104, counter 106 and output 88.

The AGC squelch amplifier 90 functions to provide the Schmitt trigger 98 with a signal whose peak-to-peak amplitude does not vary when a signal is present, and when a signal is not present does not exhibit appreciable noise amplitude. The latter function is carried out by the associated squelch circuitry (not shown) in squelch-amplifier 90. The output signal amplitude of AGC squelch-amplifier 90 is set so that it is barely larger than the hysteresis band of the Schmitt trigger 98, and the signal is offset so that only the most positive and most negative peaks of each cycle of the input waveform break the threshold of the Schmitt trigger 98 to thereby cause a transition in its output. It has been found by experimentation that perturbations caused by the higher harmonics in a singing human voice signal rarely, if ever, exceed the amplitude of the fundamental frequency and hence are unable to cause the Schmitt trigger output 100 to make more than two transitions per voice fundamental period. Consequently, the frequency of the Schmitt trigger output matches that of the fundamental voice frequency, or that of any sound whose waveshape possesses no excessive perturbations.

To properly judge pitch and rhythm of a student's musical input, several measurement techniques are used. Using the hardware previously described, the system must be able to measure (1) the pitch of a student's audible input as sung or played on a compatible instrument, (2) student rhythm by detecting and measuring the student's rests and transitions between notes, and (3) the pitch and rhythm of student exercises done on an instrument such as the piano-type keyboard 14 read directly by the controlling processor 12.

In order to perform an input signal frequency measurement, the music theory training system 10 need only to measure the average period of the signal from the Schmitt trigger 98, which is an easily measured pulse train. A commonly used technique for such measurements is to count the number of cycles of an extremely stable "clock" signal source which occur during one cycle of the input signal.

In the case of music sung or played into the system, the absolute frequency of the response by the student is not as important as the difference in that pitch from what is desired. Rather than use a fixed "clock" signal to measure the incoming pitch, the system 10: (1) causes the multiplexer 84 to select from tone generator 70 a reference frequency signal whose frequency is several times that of the target note the student is attempting to play or sing. (The reference frequency signal from multiplexer 84 is then a multiple of the target note frequency by a factor which is referred to hereinafter as $\alpha$); (2) makes the reference frequency signal available to the controlling processor 12; and (3) counts the number of cycles of this signal that occur during a specified number of listen circuit output cycles on output 88. This specified number of cycles is hereinafter referred to as $\beta$ and constitutes one sample. Each output cycle of the listen circuit is caused by one fundamental cycle of the students' audible input.

Since the "clock", the reference signal from multiplexer 84, now has the frequency of the target note times $\alpha$, there will be exactly $\alpha$ clock cycles counted per cycle of a perfect student input and exactly $\alpha$ times $\beta$ clock cycles counted during one sample of the perfect student input, regardless of the frequency of the target note. If fewer than $\alpha$ times $\beta$ cycles are counted in one sample, the pitch of the student is sharp, but if the cycles counted is greater than $\alpha$ times $\beta$, the pitch of the student input is flat. Therefore, subtracting the number of the cycles counted during a sample from the number $\alpha$ times $\beta$ would yield a number directly proportional to the pitch error made by the student, and the sensitivity of this number to student error is directly proportional to the size of $\alpha$ times $\beta$. To display the results of the pitch measurement, the controlling processor 12, as seen in FIGS. 1 and 4, must send this number that is the difference between cycles counted and $\alpha$ times $\beta$, to the pitch error display 60 over output 66. If the controlling processor 12 is used to perform the counter functions shown in FIG. 6, it may vary both $\alpha$ and $\beta$ independently. However, the top frequency available from the tone generator 70 sets the upper limit on $\alpha$ and the patience of the student awaiting a response sets the upper limit of $\beta$, as the value of $\beta$ times the inverse of the student input frequency determines the response time of the system. Within these limits, the pitch sensitivity of the system can be adjusted to present the student with progressively difficult exercises.

In order to perform rhythmic error detection through the listen circuit 86, the controlling processor 12 must compare the output 30 of the metronome 28 with the listen circuit output 88. If the time between two transitions of the metronome output, representing half the smallest musical time-division measurable to the system, occurs without a transition being detected on the output 88 of the listen circuit 86, then the student input has dropped below the squelch threshhold of the listen circuit 86 on or before the last metronome time division. This always corresponds to a musical "rest", and if on the last comparison of the metronome and listen circuit no "rest" was found, then the beginning of such a "rest" has been detected. The length of this "rest" is determined by the musical time period as measured by the metronome 28 until the next transition of the output of the listen circuit 86.

By monitoring immediate changes in pitch error, the controlling processor 12 can detect errors in the rhythm of transitions between notes of a student's input. Pitch error, as stated earlier, is found from the difference in $\alpha$ times the frequency of the student's input and that of the reference frequency signal, which is perfectly timed and pitched for the musical exercise. The reference frequency signal can be thought of as the system's model for a perfect student inut used as a standard from which to measure a student's error. If the student changes the pitch of his input to that of the next note, before or after the reference signal changes, a sudden, drastic pitch error will be registered by the system. The student is in error for the length of time that the large pitch error is detected, and the severity of his rhythmic error, of course, depends on its length.

Musical exercises could be coded digitally in a form understandable to the controlling processor 12 and stored in musical exercise data storage 108. This would be interfaced to controlling processor 12 at 110 as shown in FIG. 1.

For measurement of student input on the keyboard 14, the processor 12 need only scan the array of switches which the keyboard actuates and compare these with target notes for pitch and error detection. Since hardware for manipulation of target notes and rhythm are already present for the tone generators, minimal adaptation is required for the keyboard. For example, the keyboard switch array can be wired so that codes used for controlling the tone generator 70 are identical to those read from the keyboard, hence requiring only a comparison of music exercise codes from music exercise data storage 108 with codes read from the keyboard switches for error detection.

The foregoing system 10 has the capability of interacting with the student to exchange musical responses which each is capable of understanding and judging. Moreover, the system can judge the accuracy of the response by the student and give the student an almost instantaneous response to his errors and show the effects of corrections.

The foregoing is a description of an interactive system for pitch and rhythmic error detection and indication of both audible and mechanical student inputs to thereby teach musical skills such as sight-singing and harmony. Since the system can sense and handle student musical responses as well as give the student something to respond to, the interaction so important to music training, which it is believed was previously lacking in other music training devices and possible only with a trained music tutor, is achieved with the above-described electronic system.

With the use of LSI technology devices, the system can be designed to be both inexpensive and compact. The design of the system lends itself very readily to computer control and as a result is extremely flexible. The latter advantage allows control routines to be modified to encourage learning by the student. Although some form of computer control greatly enhances the flexibility of the foregoing system, it is not required. All of the devices of this system can be made from inexpensive integrated circuits using conventional design techniques. Accordingly, maany variations of the circuitry can be made without affecting the operation of the system.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automated music teaching system for detecting errors of pitch and rhythm in a student musical exercise with an accuracy greater than that of the human ear and for displaying both the type and the magnitude of the error in a manner useful to the student, the system being comprised of:

a system control means;

means for providing a musical input to the system; said musical input being under the control of the student and having a pitch and rhythm that is both convertible and recognizable by said system control means;

musical timing means for providing to the student a display showing the timing of musical notes, for producing an audible signal for musical timing, and for providing a musical time reference for the system control means;

tone generator means under the control of said system control means for creating and mixing tones to provide a musical output to the student; said musical output from said tone generator means inputting said system control means wherein said musical output from said tone generator means and said musical input under the control of the student are compared for errors made by the student; and a pitch error display means for displaying to the student any error detected in the pitch of said musical input to thereby challenge the pitch and rhythmic acuity of the student.

2. The automated music teaching system of claim 1 wherein said musical timing means is an electronic metronome whose output is an inverted, teardrop-shaped ring of indicator lights lit one at a time sequentially and which produces an audible signal on each beat, at which time said indicator lights have given the appearance of one complete transit of their ring shaped path by a spot of light.

3. The automated music teaching system of claim 1 wherein said pitch error display means is comprised of a row of indicator lights that form an error indication scale; said indicator lights towards one end of said indicator scale being successively illuminated when said musical input by the student becomes increasingly sharp and said indicator lights towards the other end of said indicator scale being successively illuminated when said musical input by the student becomes increasingly flat; said indicator light in the center of said indicator scale being illuminated only when said musical input by the student is of a correct pitch.

4. The automated music teaching system of claim 3 wherein said row of indicator lights is a vertical row of light emitting diodes illuminated one at a time under the control of said system control means.

5. The automated music teaching system of claim 1 wherein said tone generator means includes a digital frequency synthesizer, gating means between said digital frequency synthesizer and an analog mixer; the output from said analog mixer being amplified, under the control of said system control means, before forming said musical output from said tone generator means; said musical output being combined with said audible signal from said musical timing means and thereafter amplified to form the musical output to the student.

6. The automated music teaching system of claim 1 wherein said means for providing a musical input to the system includes a musical instrument connected directly to the system and a microphone for measuring the voice of the student.

7. The automated music teaching system of claim 1 further including a listen circuit means, under the control of said system control means, and functioning in conjunction with said musical output from said tone generator means to detect pitch errors in audible musical voice inputs made by the student; said listen circuit means functioning to detect rhythmic errors in said musical input to the system.

8. The automated music teaching system of claim 7 wherein said listen circuit means is comprised of an automatic gain control squelch amplifier for receiving the audible musical voice inputs made by the student through a microphone and a Schmitt trigger for receiving the output of said automatic gain control squelch amplifier; said system control means receiving the output from said Schmitt trigger.

* * * * *